(12) United States Patent
Rasel et al.

(10) Patent No.: US 9,545,907 B2
(45) Date of Patent: Jan. 17, 2017

(54) CONTROL VALVE DEVICE FOR A RAIL VEHICLE BRAKE

(71) Applicant: KNORR-BREMSE SYSTEME FÜR SCHIENENFAHRZEUGE GMBH, Munich (DE)

(72) Inventors: Thomas Rasel, Höhenkirchen-Siegertsbrunn (DE); Marc-Oliver Herden, Munich (DE); Achim Vollmer, Höhenkirchen-Siegertsbrunn (DE)

(73) Assignee: KNORR-BREMSE SYSTEME FUR SCHIENENFAHRZEUGE GMBH, Munich (DE)

( * ) Notice: Subject to any disclaimer, the term of this patent is extended or adjusted under 35 U.S.C. 154(b) by 52 days.

(21) Appl. No.: 14/400,520

(22) PCT Filed: May 13, 2013

(86) PCT No.: PCT/EP2013/059848
§ 371 (c)(1),
(2) Date: Nov. 11, 2014

(87) PCT Pub. No.: WO2013/167759
PCT Pub. Date: Nov. 14, 2013

(65) Prior Publication Data
US 2015/0130267 A1 May 14, 2015

(30) Foreign Application Priority Data

May 11, 2012 (DE) .................. 10 2012 009 427

(51) Int. Cl.
*B60T 15/02* (2006.01)
*B60T 13/66* (2006.01)
(Continued)

(52) U.S. Cl.
CPC ............ *B60T 15/021* (2013.01); *B60T 8/1705* (2013.01); *B60T 8/3235* (2013.01); *B60T 8/361* (2013.01);
(Continued)

(58) Field of Classification Search
CPC .... B60T 13/665; B60T 13/365; B60T 13/683; B60T 15/021; B60T 15/302; B60T 15/42; B60T 15/27; B60T 17/228
(Continued)

(56) References Cited

U.S. PATENT DOCUMENTS 4,163,587 A * 8/1979 Limozin ............... B60T 8/1893
303/22.6
4,577,910 A 3/1986 Worbois
(Continued)

FOREIGN PATENT DOCUMENTS

CN 101410284 A 4/2009
DE 1090701 B 10/1960
(Continued)

OTHER PUBLICATIONS

Office Action for German Patent Application; Feb. 25, 2014 (English translation attached).
(Continued)

*Primary Examiner* — Robert A Siconolfi
*Assistant Examiner* — San Aung
(74) *Attorney, Agent, or Firm* — Barnes & Thornburg LLP

(57) ABSTRACT

A control valve device for a highly available pneumatic brake system for a rail vehicle, having a compressed-air inlet which is or can be connected to an outlet of a discharge valve device; a compressed-air outlet which is or can be connected to a relay valve device; and a safety input which is or can be connected to a compressed-air source; wherein the control
(Continued)

valve device fluidically connects the safety inlet to the compressed-air outlet in a first switching position and fluidically connects the compressed-air inlet to the compressed-air outlet in a second switching position; wherein the control valve device can modify the inlet pressure in the second switching position in accordance with a control device, in order to provide the outlet pressure.

9 Claims, 1 Drawing Sheet

(51) Int. Cl.
*B60T 17/22* (2006.01)
*B60T 8/17* (2006.01)
*B60T 8/32* (2006.01)
*B60T 8/36* (2006.01)
*B60T 8/88* (2006.01)

(52) U.S. Cl.
CPC .............. *B60T 8/885* (2013.01); *B60T 13/665* (2013.01); *B60T 17/228* (2013.01); *B60T 2270/402* (2013.01); *B60T 2270/414* (2013.01)

(58) Field of Classification Search
USPC .......................... 303/57, 33, 128, 38; 188/34
See application file for complete search history.

(56) References Cited

U.S. PATENT DOCUMENTS

| | | | |
|---|---|---|---|
| 4,660,895 A | | 4/1987 | Chlumecky et al. |
| 2004/0119331 A1* | | 6/2004 | Long .................... B60T 13/665 303/3 |
| 2007/0236077 A1 | | 10/2007 | Schweikert et al. |
| 2010/0072809 A1 | | 3/2010 | Newton |
| 2011/0089755 A1* | | 4/2011 | Itano .................... B60T 8/1893 303/14 |
| 2011/0121640 A1 | | 5/2011 | Matsuyama et al. |
| 2012/0286563 A1* | | 11/2012 | Lichterfeld ........... B60T 8/1705 303/15 |

FOREIGN PATENT DOCUMENTS

| | | |
|---|---|---|
| DE | 2801778 A1 | 7/1979 |
| DE | 19848990 A1 | 4/2000 |
| DE | 102005019479 B3 | 1/2007 |
| DE | 102005061551 B3 | 6/2007 |
| DE | 102008012700 B3 | 6/2009 |
| DE | 102010005091 A1 | 7/2011 |
| DE | 102010012498 A1 | 9/2011 |
| DE | 102012009427 A1 | 11/2013 |
| EP | 0586203 A2 | 3/1994 |
| EP | 1270353 A2 | 1/2003 |
| EP | 1550593 A1 | 7/2005 |

OTHER PUBLICATIONS

Office Action for German Patent Application; Apr. 10, 2014 (English translation attached).
Opposition Letter filed with German Patent Office; Feb. 19, 2014 (English translation attached).
Response to Opposition Letter filed with German Patent Office; Sep. 15, 2014 (English translation attached).
English Translation of Notification Concerning Transmittal of International Preliminary Report on Patentability and Written Opinion of the International Search Authority for International Patent Application No. PCT/EP2013/059848, dated May 13, 2013.
Office Action for German Patent Application; Feb. 25, 2014.
Office Action for German Patent Application; Apr. 10, 2014.
Opposition Letter filed with German Patent Office; Feb. 19, 2014.
Response to Opposition Letter filed with German Patent Office; Sep. 15, 2014.
Search Report for International Patent Application No. PCT/EP2013/059848; Feb. 19, 2014.
Chinese Office Action for Chinese Application No. 201380036601. 1, dated Mar. 24, 2016.

* cited by examiner

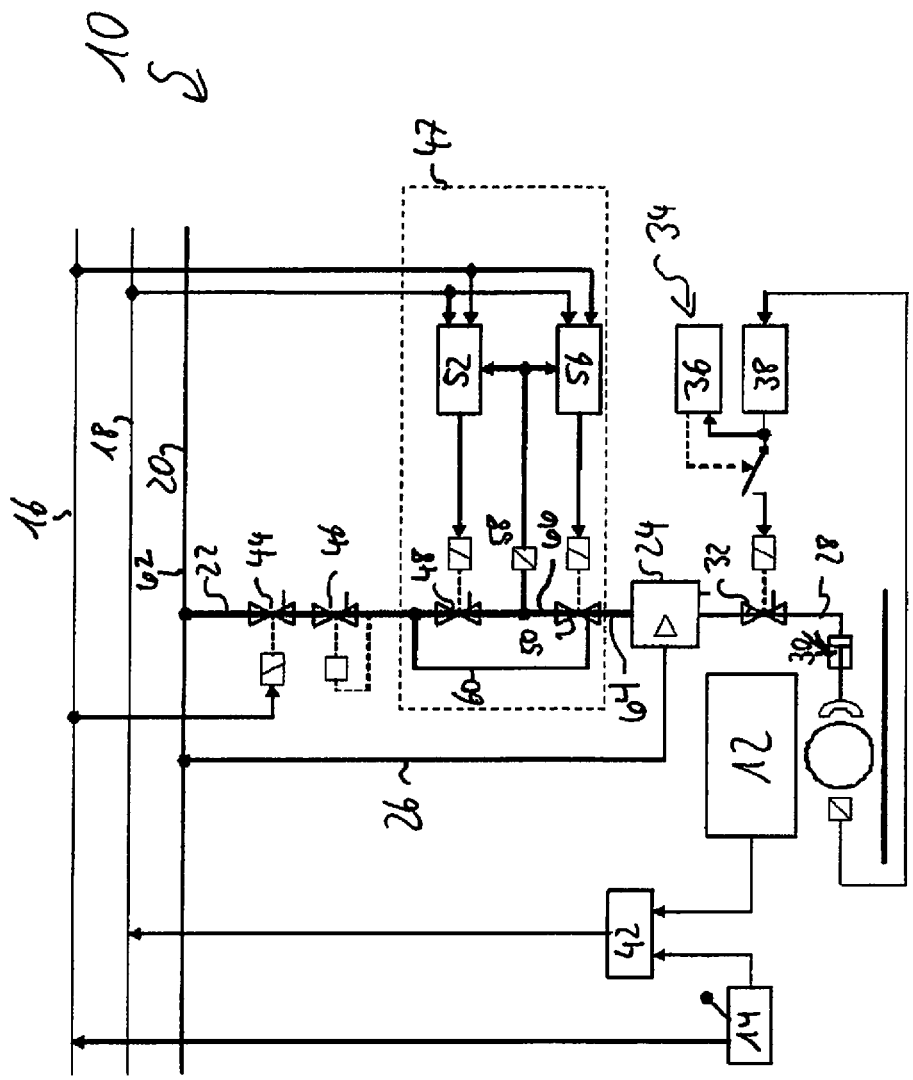

US 9,545,907 B2

CONTROL VALVE DEVICE FOR A RAIL VEHICLE BRAKE

PRIORITY CLAIM

This patent application is a U.S. National Phase of International Patent Application No. PCT/EP2013/059848, filed 13 May 2013, which claims priority to German Patent Application No. 10 2012 009 427.2, filed 11 May 2012, the disclosures of which are incorporated herein by reference in their entirety.

FIELD

Disclosed embodiments relate to a control valve device for a highly available pneumatic brake system for a rail vehicle, a pneumatic brake system for a rail vehicle and a rail vehicle.

SUMMARY

Rail vehicles frequently comprise pneumatic brake systems that can convert a brake pressure into a braking effect. A pneumatic brake generally undertakes the function of a service brake that can carry out controlled or regulated braking. For safety reasons a brake with particularly high availability is provided, which can also carry out braking e.g. in the event of a failure of a power supply. Frequently, the brake is provided by means of the pneumatic brake device, which is equipped with suitable pneumatic elements for ensuring the high availability and may share certain elements such as compressed air reservoirs, lines and brake devices with the service brake. The controlling or releasing of the brake with high availability is particularly robust and reliable and can be executed even in the event of failure of control devices and electronics. A highly available brake is as a rule already designed during development to be able to provide a defined target deceleration even in the case of operational fluctuations of brake properties.

Disclosed embodiments improve an inlet pressure control valve device for a highly available brake device.

BRIEF DESCRIPTION OF THE FIGURES

In the figures:
FIG. 1 shows schematically an example of a pneumatic brake system of a rail vehicle.

DETAILED DESCRIPTION OF THE DISCLOSED EMBODIMENTS

Within the context of this description, a rail vehicle can refer to one or a plurality of carriages with or without its own drive and/or a tractor vehicle in any combination. In particular, a rail vehicle can comprise motor coaches. Generally, two pneumatic components such as e.g. lines and valve device can be viewed as being connected together if a fluid, especially compressed air, is able to flow between them. Two pneumatic components can be viewed as being able to be connected together if, by suitable connection and/or setting of one or a plurality of pneumatic components, a state can be achieved in which the components are connected to each other. Furthermore, electrical or electronic or electropneumatic components can be viewed as being connected to each other or being able to be connected to each other if an electric current can flow between them or components can be connected such that an electric current can flow between them. A brake system can comprise one or a plurality of brake devices, which can be distributed among one or a plurality of carriages. A brake device can be provided to convert a brake pressure into a braking effect by friction that can be produced by a suitable friction brake device. Such a friction brake device can be operated by the brake pressure such that it is pressed against a rotating component such as a wheel or a brake disk to produce a braking effect. A brake device can especially be a shoe brake or disk brake or a combined shoe/disk brake. A control line can be provided that can extend across the vehicle. A control line can be designed to transfer a signal, especially a trigger signal for triggering braking. The control line can be an electrical or pneumatic line. Accordingly, the trigger signal can be an electrical or pneumatic signal. A signal can e.g. be the result of a voltage change, e.g. a voltage decrease or a voltage increase, or of a change of pressure, e.g. a pressure decrease or a pressure increase. A signal can be pulse width modulated. It is also conceivable that a plurality of signals can be transferred simultaneously by means of a control line, e.g. by superimposing or adding the signals onto or to an electrical line. A pneumatic brake system can be designed to provide an input control pressure based on a signal transferred by a control line, e.g. a trigger signal or a brake signal. The input control pressure can be provided from a suitable input control pressure reservoir and possibly by means of suitable valve devices and pneumatic or electropneumatic components. The brake system can be designed to pass the input control pressure to a relay valve device. A relay valve device can be designed to convert an input control pressure into a brake pressure, which can be capable of being fed to one or a plurality of brake devices for operation. In particular, the relay valve device can be designed to convert an input control pressure into a large air volume and/or to adjust the brake pressure depending on the input control pressure. A desired brake pressure can thus be produced by providing and/or controlling the input control pressure with relatively small pneumatic or electropneumatic components. The relay valve device can be connected to or can be capable of being connected to a compressed air reservoir to convert the input control pressure. A pneumatic brake system can comprise service brake functionality and can be used as a service brake, which can sometimes be used with additional brake systems such as e.g. magnetic rail brakes and/or dynamic brakes for the controlled braking of a rail vehicle. For this purpose, a main brake valve device controllable by a control device can be provided, which is capable of controlling and/or regulating an input control pressure during braking. Because of the variety of components, especially for control, a service brake can be rather sensitive to component failure. For safety reasons a pneumatic brake system can comprise high availability functionality and can be a highly available brake system. A highly available brake system can be designed to produce a guaranteed defined braking effect and/or a defined brake pressure on being triggered. Braking by a highly available brake system or braking carried out by high availability functionality can be emergency braking or rapid braking and/or is generally referred to as safety braking. The defined brake pressure and/or the defined braking effect can be specified using a characteristic curve in the event of triggering and e.g. can depend on parameters such as the mass of the rail vehicle and a speed in the event of triggering the braking. A highly available brake system can be designed to provide the defined brake pressure and/or the defined braking effect even independently of or in the event of failure of other brake systems of the rail vehicle and/or in the event of failure of a power supply or a main brake valve device. The defined brake pressure and/or the defined braking effect for high availability functionality can be specified during the development of the vehicle to achieve a desired average vehicle deceleration for braking. In particular, it can be provided that a target deceleration is defined for safety braking that is to be achieved by the defined brake pressure and/or the defined braking effect. In the case of safety braking it can be provided that the target deceleration is not controlled and/or is not subjected to any change over time. The brake system can be designed to provide a certain input control pressure to achieve the defined brake pressure and/or the target deceleration. A control device can be provided for triggering safety braking. The control device can be manually triggerable by a driver and e.g. be a lever or knob. It is conceivable that the control device has a setting for triggering the braking and a setting in which braking is not triggered and/or is interrupted. In particular, it can be provided that the control device has no intermediate settings for controlling the braking effect. It is conceivable that the control device is connected or can be connected by means of a control line to a control device and/or a triggering valve device. Generally a highly available pneumatic brake system can comprise a triggering valve device, which can be designed to trigger braking by means of a control line and according to a control device. It can be provided that the highly available brake system automatically triggers braking in the event of a significant fault in the brake system, e.g. if a main air line is broken. The triggering valve device can comprise an input and an output. By means of the input the triggering valve device can be connected or can be capable of being connected to a compressed air reservoir. The output can be connected or can be capable of being connected to a relay valve device for providing an input control pressure by means of an input control pressure line and possibly other valve devices. In particular, it can be provided that a pressure limiting valve is connected upstream or downstream of the triggering valve device. Such a pressure limiting valve can also be integrated within the triggering valve device. The triggering valve device can be controlled electrically or pneumatically by means of a control line, e.g. by a control device. The triggering valve device can comprise an air discharge outlet. The triggering valve device can generally comprise a 3/2-way valve. It is conceivable that in a first switch position the triggering valve device connects the input to the air discharge outlet and blocks the output and in a second switch position connects the input to the output and blocks the air discharge outlet. A flow direction of the brake system can generally be defined as extending from a pressure reservoir via a triggering valve device to a relay valve device. Accordingly, a relay valve device can be disposed downstream of a triggering valve device.

Disclosed embodiments relate to a control valve device for a highly available pneumatic brake system for a rail vehicle, with a compressed air input 62 which is or can be connected to an output of a triggering valve device, and by means of which a defined input pressure can be fed to the control valve device, as well as a compressed air output 64 which is or can be connected to a relay valve device, and by means of which an output pressure can be fed to the relay valve device. The control valve device further comprises a safety input 66, which is or can be connected to a compressed air supply; wherein in a first switch position the control valve device fluidically connects the safety input to the compressed air output and in a second switch position it fluidically connects the compressed air input to the compressed air output. The control valve device is designed to modify the input pressure in the second switch position according to a control device to provide the output pressure. The control valve device can thus be disposed between the relay valve device and the triggering valve device and can modify an input pressure provided by the triggering valve device. The output pressure can be fed to the relay valve device as an input control pressure. This enables controlled safety braking. In particular, it is possible to compensate fluctuations of the braking power of individual brake devices arising during the operation of a rail vehicle. Such fluctuations can e.g. occur as a result of brake lining wear, variable wheel diameter or variations in the efficiencies of braking force generators of the brake devices. Because such fluctuations can be compensated during operation, the development and certification of brake systems and rail vehicles is made easier. The control valve device can comprise one or a plurality of valves. The valves of the control valve device can be electrically or pneumatically controllable separately from each other, e.g. by a suitable control device, which can be an electronic control device. In particular, the control valve device can comprise an electrically or pneumatically controllable adjustment valve. An adjustment valve can comprise an input and an output. The input can be used as a compressed air input of the control valve device. It is conceivable that an adjustment valve is designed to adjust a pressure applied at its input, which can be the input pressure of the control valve device, and to forward the adjusted pressure via its output. In particular, an adjustment valve can comprise an electrically or pneumatically controllable air discharge outlet, via which a pressure applied at the input can be reduced. An adjustment valve can be a 3/2-way valve, e.g. a solenoid valve. In the first switch position of the control valve device the adjustment valve can be switched into an air discharge position, such that it connects its input to its air discharge outlet and blocks its output. In the second switch position of the control valve device, the adjustment valve can be switched into a through connection position such that it connects its input to its output and/or is alternatingly switched between the through connection position and the air discharge position to forward a reduced pressure. Downstream of the adjustment valve, a safety valve can be connected so that an input of the safety valve is or can be connected to the output of the adjustment valve. The safety valve can comprise an output that is connected to the input of the safety valve in a through connection position of the safety valve. Furthermore, the safety valve can comprise a safety input that can be blocked in a through connection position of the safety valve. The safety input of a safety valve can be connected or can be capable of being connected to a pressure source and thus can be viewed as a safety input of the control valve device. A safety valve can be a 3/2-way valve, especially a solenoid valve. In a safety position of the safety valve, its output can be connected to the safety input, whilst its input is blocked. The safety valve can be designed such that it takes up the safety position without external control, e.g. as a result of a suitable bias by a spring. It is conceivable that the output of a safety valve acts as a compressed air output of the control valve device. In the first switch position of the control valve device a safety valve can be switched into the safety position. It is conceivable that in the second switch position of the control valve device the safety valve is switched into the through connection position, e.g. by a suitable control. The adjustment valve and the safety valve can, if present, be combined to form an assembly or can be formed separately from each other. The control valve device can be connected or can be capable of being connected to a pressure control device, which can be an electronic control device. The control valve device can comprise the pressure control device. The pressure control device can be designed to control the control valve device, especially an adjustment valve and/or a safety valve. The control valve device can comprise one or a plurality of pressure sensors and/or can be connected or be capable of being connected to such sensors. A pressure control device can be designed to receive signals from the sensor(s) and to control the control valve device on the basis of such signals. A pressure sensor can e.g. be disposed such that it can detect an output pressure of the control valve device, e.g. downstream of the compressed air output and/or between an adjustment valve and a safety valve. The pressure control device can be connected or be capable of being connected by means of a control line to a control device of the brake system to receive a trigger signal. Alternatively or additionally, the pressure control device can be connected or be capable of being connected by means of an adjustment control line to an adjustment control device, which can be an electronic control device. An adjustment control device can be designed to detect an actual deceleration of the rail vehicle during safety braking and to compare the same with a target deceleration. For this purpose, the adjustment control device can, e.g., be connected or be capable of being connected to suitable sensors, e.g. speed sensors and/or inertial sensors and/or acceleration sensors, and/or to the control device. The adjustment control device can be designed to provide an adjustment signal by means of the adjustment control line. The pressure control device can be designed to control the control valve device based on the adjustment signal e.g. to increase the output pressure if the actual deceleration is lower than the target deceleration. Thus control of the safety braking can be achieved in a simple manner to compensate wear effects and fluctuations in the brake system. The control valve device can easily be retrospectively fitted to existing systems. It is conceivable that the control valve device is modular and/or an assembly. The pressure control device can be connected or is capable of being connected to a monitoring module that can be part of the pressure control device or separate therefrom. The monitoring module can be designed to detect errors in the adjustment of the output pressure, e.g. because insufficient pressure occurs. For this purpose, the monitoring module can be connected to one or a plurality of pressure sensors, e.g. to the already mentioned pressure sensors. It is also conceivable that the monitoring module is connected to other pressure sensors to enable a redundancy in the pressure monitoring. The monitoring module can be designed to control the control valve device, and especially to cause the control valve device to switch from the first switch position into the second switch position only if there is no error. The monitoring module can be connected or be capable of being connected to the adjustment control line and/or the control line. In particular, the monitoring module can be designed to control a safety valve and to switch the safety valve between the through connection position and the safety position. The operating reliability of the brake system can thus be increased. The pressure source can provide a defined maximum permissible input control pressure, which can be provided in the first switch position of the control valve device as the output pressure and thus as the effective input control pressure. In the second switch position of the control valve device the input control pressure can be adjusted, especially reduced. In the case of safety braking with a functional control valve device, the input control pressure can thus be controlled, wherein the input control pressure is less than the maximum input control pressure. If the control valve device fails, the maximum input control pressure is effective. The maximum input control pressure can be greater than an input control pressure normally provided for safety braking to enable an increase of the braking effect.

The safety valve input can be fluidically connected or be capable of being fluidically connected by means of a bypass line to the output of the triggering valve device. The output of the triggering valve device is thus used as the compressed air supply. The maximum input control pressure can easily be determined in this way by means of the triggering valve device and/or the compressed air reservoir connected thereto.

It can be provided that the control valve device comprises an air discharge outlet, by means of which the input pressure can be reduced to obtain the output pressure. The air discharge outlet can be provided by an air discharge outlet of an adjustment valve.

The control valve device can be designed to take up the first switch position without being controlled. In particular, it can be provided that a safety valve is biased such that it changes to the safety position without being controlled in the opposite direction. An adjustment valve can be designed to change into the air discharge position in the first switch position of the control valve device. Suitable spring devices for providing a bias can be provided.

The triggering valve device can comprise an emergency brake valve, a rapid brake valve or a brake control valve of a service brake. Already present valves can thus be used, which especially facilitates retrospective fitting of the control valve device.

It is conceivable that the control valve device is designed to modify the input pressure based on an adjustment signal transferred by means of an adjustment control line. The adjustment signal can be capable of being produced based on a comparison of the actual deceleration with a target deceleration. Furthermore, the control valve device can comprise a control device, which is designed to receive data from at least one other sensor of the rail vehicle or at least one other control device of the rail vehicle, from which data an actual braking effect, especially the actually occurring and completed deceleration of the rail vehicle, is apparent, wherein the control device is designed to determine the adjustment signal on the basis of the data received from the at least one other sensor of the rail vehicle or at least one other control device of the rail vehicle. This enables the clamping force of the safe brake to be modified within a limited range. Because of that the brake system can be adapted to the parameter fluctuations of the brake system. The adjustment takes place e.g. by means of an associated train-wide modification signal and is monitored at carriage level by an associated watchdog as a control unit. The fail-safe state can thus be the maximum necessary clamping force and hence the maximum brake pressure. It is particularly advantageous with the exemplary embodiment that the certification of the vehicles is simplified. Different linings can also be used within the possible range of adjustment, at least train-wide. The introduction of the state of the safe brake can also e.g. be carried out as previously. The adjustment of the brake system e.g. takes place by means of an additional train-wide line (as a modification of the safe brake) as well as an associated monitoring device.

The control valve device can comprise a pressure limiting function, optionally a controllable pressure limiting function. The pressure limiting function can e.g. be provided by suitable control of an adjustment valve by a pressure control device. An additional pressure limiting valve, which is normally connected downstream of a triggering valve device, can thus be omitted.

In the case of one development, the control valve device can comprise a monitoring module that enables the control valve device to switch between the first and the second switch positions. The monitoring module increases safety during operation. In particular, the monitoring module can be designed to provide a fail-safe state in which there is a maximum input control pressure.

Disclosed embodiments relate moreover to a pneumatic brake system for a rail vehicle that comprises a high availability function and includes a control valve device that is described herein. The brake system can comprise an adjustment control device and/or one or a plurality of control lines and/or one or a plurality of compressed air reservoirs and/or a control device and/or one or a plurality of brake devices and/or one or a plurality of relay valve devices and/or one or a plurality of triggering valve devices that are described herein. The brake system can comprise service brake functionality. Separate input pressure lines can be provided for service brake functionality and high availability functionality. It is conceivable that control valve devices that are described herein are provided at the carriage level.

Furthermore, disclosed embodiments relate to a rail vehicle with a control valve device that is described herein and/or a pneumatic brake system that is described herein.

The invention is now described with reference to the accompanying FIGURE using an exemplary embodiment by way of example.

FIG. 1 shows an example of a schematically illustrated pneumatic brake system 10 of a rail vehicle, which is symbolically represented by a carriage 12. The brake system 10 comprises a control device 14 that is represented as a brake lever in the example. The control device 14 is connected to a control line 16. If the control device 14 is operated by a user, e.g. a driver of the rail vehicle, a trigger signal is transferred by means of the control line 16. In the example shown in FIG. 1, the control line 16 is an electrical line. It is also conceivable that the control line is a fluidic line, e.g. a pneumatic line. In particular, the control line 16 can be a main air line of an indirect brake system of a rail vehicle. Furthermore, an adjustment control line 18 is provided that in the example is also an electrical line. It is also conceivable that the adjustment control line 18 is a pressure line, e.g. a pneumatic line. The brake system 10 also comprises one or a plurality of pressure reservoirs 20. The pressure reservoir 20 can especially comprise one or a plurality of containers, in which a pressure reserve is stored at a maximum input control pressure Cv1max for triggering a high availability function of the brake system. An input control pressure line 22 is provided, by means of which a relay valve 24 can be fluidically conductively connected to the compressed air reservoir 20. A plurality of valve devices are disposed between the relay valve 24 and the compressed air reservoir 20. The relay valve 24 is also connected by means of another line 26 to the compressed air reservoir 20. The relay valve 24 is designed to provide a brake pressure C based on an input control pressure Cv1 provided by means of the input control pressure line 22. The relay valve 24 can thereby convert the input control pressure Cv1 directly into a brake pressure C or can boost the input control pressure Cv1. The relay valve 24 is also connected by means of a brake pressure line 28 to a brake device 30. The brake pressure C can be fed by means of the brake pressure line 28 to the brake device 30, which can convert the brake pressure C into a braking effect. An outlet valve 32 of a wheel-slide protection device 34 is provided in the brake pressure line 28. The wheel-slide protection device 34 also comprises a control device 36, which enables the outlet valve 32 to be controlled based on data provided by a slip detection device 38. The slip detection device 38 is connected to one or a plurality of wheel revolution rate sensors 40 and is designed to determine a wheel-slide state or slip state of one or a plurality of wheels based on signals of the wheel revolution rate device 40. If a wheel-slide state or slip state is detected, the control device 36 controls the outlet valve 32 to reduce the brake pressure acting on the brake device 30, e.g. by periodically controlled venting of the brake pressure line 28 by means of the outlet valve 32. An adjustment control device 42 is also provided. The adjustment control device 42 is designed to determine a potentially necessary adjustment of the brake pressure or of the input control pressure during the control of braking by means of the control device 14. For this purpose, the adjustment control device 42 is connected to the control device 14 and is able to receive signals relating to the operation of the control device 14 for triggering a high availability brake function or safety braking. A specified target deceleration and a corresponding target brake pressure or target input control pressure are associated with safety braking. Furthermore, the control device 42 is designed to receive data from other sensors of the rail vehicle or other control devices of the rail vehicle, from which an actual braking effect, especially the actually occurring and completed deceleration of the rail vehicle, i.e. the actual deceleration, is apparent. In particular, the adjustment control device 42 is capable of determining whether an actual deceleration corresponds to a target deceleration. If the adjustment control device 42 determines that the actual deceleration is lower than the target deceleration, then it transfers an adjustment signal by means of the adjustment control line 18. A modification of the input control pressure can be carried out based on the adjustment signal. A triggering valve device 44 is provided in the input control pressure line 22. The triggering valve device 44 is designed to initiate a high availability brake function of the brake system 10 based on a signal from the control line 16. In the normal state, i.e. if the high availability brake function has not been triggered, the triggering valve device 44 vents the control line 22 and especially blocks the connection to the compressed air reservoir 20. If there is a trigger signal on the control line 16, the triggering valve device 44 makes a connection between its output and the compressed air reservoir 20 and blocks the venting. Within the control line 22 a pressure limiting valve 46 can be connected to the output of the triggering valve device 44, and can reduce the flowing pressure to a specified extent. It can thus be ensured that only a specified maximum input control pressure Cv1max occurs across the pressure limiting valve 46 in the line 22. The pressure limiting valve 46 is, however, optional. A control valve device 47 is connected between the output of the pressure limiting valve 46 and an input control pressure input of the relay valve 24. In the example the control valve device 47 comprises an adjustment valve 48, downstream of which is connected a safety valve 50. A pressure control device 52 is also provided, which enables the adjustment valve 48 to be controlled based on signals from the control line 16 and from the adjustment control line 18. In particular, the pressure control device 52 is designed to vent the control line 22 by means of the adjustment valve 48 to reduce the input control pressure provided by means of the valves 44 and 46. If an increase of the input control pressure is controlled by means of the adjustment control line 18, the degree of venting of the input control pressure line 22 can be reduced. A monitoring module 56 is also provided, which is capable of controlling the safety valve 50. Moreover, a pressure sensor device 58 is provided that is capable of detecting the pressure in the input control pressure line 22 downstream of the adjustment valve 48. In the example the sensor device 58 is connected to the valve control device 52 and the monitoring module 56 for data transfer. It is however also conceivable that the control device 52 and the module 56 are each associated with separate respective pressure sensor devices. This enables the safety-relevant redundancy of the system to be improved. The safety valve 50 is connected by means of a safety line 60 to a point of the input control pressure line 22 that is upstream of the adjustment valve 48 and is thus connected or capable of being connected to an output of the triggering valve device 44. The monitoring module 56 is designed to monitor the operation of the control valve device 47. If there is a fault, e.g. if the power supply or e.g. the adjustment control line 18 fails, the monitoring module 56 controls the safety valve 50 to block its input that is connected to the adjustment valve 48 and to make a connection between the pressure line 60 and its output. Thus the pressure provided by means of the brake triggering valve device 44, possibly limited by the valve device 46, can be forwarded to the relay valve 24. The triggering valve device 44 comprises an input, an output and an air discharge outlet. In normal operation the input is connected to the air discharge outlet and the output is blocked. If the triggering valve device 44 is controlled to trigger a high availability brake function, a fluidic connection is made between input and output and the discharge output is shut off. The pressure limiting valve 46 also comprises an input, an output and a discharge output. If the pressure provided by the brake triggering valve device 44 exceeds a prescribed value, the pressure limiting valve 46 limits it to a specified value Cv1max. The triggering valve device 44 can comprise a pneumatic or an electropneumatic valve, e.g. a solenoid valve. It is provided that the triggering valve device 44 is designed to connect the input and the output to each other and to block the discharge output in a currentless state or in a state in which no control pressure is delivered by means of a pneumatic control line 16, so that high availability braking is initiated if the power supply fails or if damage occurs to the control line 16. The adjustment valve 48 can be a controllable valve, e.g. of a pilot control valve or of a solenoid valve. It can comprise an input, an output and an air discharge outlet. The input is connected by means of the control line 22 to the output of the pressure limiting valve 46. The output of the adjustment valve 48 is connected to an input of the safety valve 50. The safety valve 50 can comprise an input, an output and a safety input. The safety valve 50 is connected to or is capable of being connected to the compressed air line 60 by means of the safety output. The output of the safety valve 50 is connected to an input of the relay valve 24. In a first switch position of the control valve device 47, the safety valve 50 is switched to the safety position; the adjustment valve 48 can be switched to the discharge position. The control valve device 47, especially the adjustment valve 48, is thus bypassed and it is ensured that the maximum input control pressure is applied to the relay valve 24. In the second switch position of the control valve device 47 the safety valve 50 and the adjustment valve 48 are in the through connection position, so that the input control pressure can be adjusted.

In other words, the approach presented here according to the described exemplary embodiment can be summarized or explained as follows.

In the case of a brake system with friction brakes there is the safe brake state. Within the state the brake system is intended to achieve an average instantaneous vehicle deceleration under characteristic curve control. Because of parameter fluctuations within the brake system, fluctuations of the instantaneous vehicle deceleration occur. Significant known parameters here are e.g. a coefficient of friction of the brake lining, the efficiency of the brake force generator and/or a wheel diameter.

The fluctuations of the vehicle deceleration result in a fluctuation of the braking distance. In particular, the working point-dependent fluctuations of the coefficient of friction of the lining, such as e.g. being dependent on the mass to be decelerated and/or the initial braking speed, sometimes result during the certification of vehicles in a compromise being sought for the adopted average coefficient of friction of the lining across all scenarios. On this basis a modification of the braking calculation then takes place and thus an adjustment of the safe brake characteristic curves is carried out. A plurality of iteration runs can also potentially be necessary here.

Moreover, local, e.g. speed-dependent peaks of the coefficient of friction of the lining, if the permissible wheel to rail adhesion is thereby exceeded, can lead to an extension of the braking distance, because as a result the whole level of deceleration of the braking should be reduced. Ultimately, with a solution of the above-mentioned problems a certification/assessment of the vehicle for one or two brake linings takes place.

In conventional systems a safe brake is controlled using a characteristic curve, wherein an average instantaneous deceleration fluctuates based on the above-mentioned influencing parameters.

With the approach proposed here, generally the safe brake clamping force can be modified within a limited range, so that the brake system can be adapted to the parameter fluctuations of the brake system. The adjustment takes place especially by means of an associated train-wide modification signal and is monitored at the carriage level by an associated watchdog such as the control valve device 47. The fail-safe state is then reached if the maximum necessary clamping force and thus the maximum brake pressure are achieved.

The approach proposed here is particularly advantageous in that the certification of the vehicles is simplified. Furthermore, within the possible range of adjustment different linings can be used, at least train-wide. The initiation of the safe brake state can also be carried out as previously. The adjustment of the brake system takes place e.g. by means of an additional train-wide line (as a modification of the safe brake) and an associated monitoring device.

In at least one exemplary embodiment, an initiation of the safe brake(ing) is carried out by means of the SafeBrake 16 signal from FIG. 1, wherein a signal value of Cv1max is thereby produced on the line. This corresponds to the prior art. Furthermore, a train-wide correction signal AdaptValue (signal 18 from FIG. 1) can be determined from A_set (brake calculation) and A_Car. A conversion, at the carriage level, of the instantaneously required brake pressure Cv1adapt on the basis of the signal AdaptValue 18 by CvCtrl (Unit 52 of FIG. 1). Signals of components present in the prior art are processed in a changed combination here.

Monitoring of Cv1adapt as the signal between the units 48 and 50 of FIG. 1 is also carried out locally within a carriage (i.e. limited to one carriage of the rail vehicle) by means of the monitoring module dPmax (unit 56 of FIG. 1). The monitoring module 56 (dPmax) also receives the information regarding the state of the signals SafeBrake 16 and AdaptValue 18 and monitors Cv1adapt for correct conversion. The module dPmax (56) can change the system into the FailSafe state Cv1=Cv1max.

The conversion of the signal Cv1 to the signal C1 by means of the relay valve 24 and the adjustment of signal C1 to the adhesion between wheel and rail to the signal Cwsp 28 by the wheel-slide protection unit 38 (WSP) is shown here for completeness.

The features of the invention disclosed in the above description, in the figures and in the claims may be essential for the implementation of the invention both individually and also in any combination.

REFERENCE CHARACTER LIST 10 brake system
12 carriage
14 control device
16 control line
18 adjustment control line
20 compressed air reservoir
22 input control pressure line
24 relay valve
26 compressed air line
28 brake pressure line
30 brake device
32 outlet valve
34 wheel-slide protection device
36 control device
38 slip detection device
40 wheel revolution rate sensor device
42 adjustment control device
44 triggering valve device
46 pressure limiting valve
47 control valve device
48 adjustment valve
50 safety valve
52 pressure control device
56 monitoring module
58 pressure sensor device
60 bypass line
62 compressed air input
64 compressed air output
66 safety input

The invention claimed is:

1. A control valve device for a highly available pneumatic brake system for a rail vehicle, the device comprising,
   a compressed air input, which is selectively connected to an output of a triggering valve device, and by which a defined input pressure can be fed to the control valve device;
   a compressed air output, which is connected to an input of a relay valve device and by which an output pressure can be fed to the relay valve device; and
   a safety input, which is selectively connected to a compressed air supply;
   wherein, in a first switch position, the control valve device fluidically connects the safety input to the compressed air output and in a second switch position it fluidically connects the compressed air input to the compressed air output;
   wherein, in the second switch position, the control valve device is designed to modify the input pressure according to a control device to provide the output pressure, and
   wherein the safety input is selectively fluidically connected to an output of the triggering valve device by a bypass line.

2. The control valve device of claim 1, wherein the control valve device comprises an air discharge outlet, by which the input pressure can be reduced in order to obtain the output pressure.

3. The control valve device of claim 1, wherein the control valve device is designed to take up the first switch position without being controlled.

4. The control valve device of claim 1, wherein the triggering valve device comprises an emergency brake valve, a rapid brake valve or a brake control valve of a service brake.

5. The control valve device of claim 1, wherein the control valve device is designed to modify the input pressure based on an adjustment signal transferred by means of an adjustment control line and/or wherein the control valve device comprises a control device, which is designed to receive data from at least one other sensor of the rail vehicle or at least one other control device of the rail vehicle, from which data an actual braking effect, especially the actually occurring and completed deceleration of the rail vehicle, is apparent, wherein the control device is designed to determine the adjustment signal on the basis of the data received from the at least one other sensor of the rail vehicle or at least one other control device of the rail vehicle.

6. The control valve device of claim 1, wherein the control valve device comprises a pressure limiting function, preferably a controllable pressure limiting function.

7. The control valve device of claim 1, wherein the control valve device comprises a monitoring module that enables the control valve device to switch between the first and the second switch positions.

8. A pneumatic brake system for a rail vehicle that has high availability functionality, and a control valve device, the system comprising:
   a compressed air input, which is selectively connected to an output of a triggering valve device, and by which a defined input pressure can be fed to the control valve device;
   a compressed air output, which is connected to an input of a relay valve device and by which an output pressure can be fed to the relay valve device; and
   a safety input, which is or can be connected to a compressed air supply;
   wherein, in a first switch position, the control valve device fluidically connects the safety input to the compressed air output and in a second switch position it fluidically connects the compressed air input to the compressed air output;
   wherein, in the second switch position, the control valve device is designed to modify the input pressure according to a control device to provide the output pressure,
   wherein the safety valve input is selectively fluidically connected to an output of the triggering valve device by a bypass line.

9. A rail vehicle with a control valve device as claimed in claim 1 and/or a pneumatic brake system as claimed in claim 8.

* * * * *